United States Patent [19]

Helgorsky et al.

[11] 4,169,130

[45] Sep. 25, 1979

[54] LIQUID/LIQUID EXTRACTION OF GALLIUM VALUES FROM HIGHLY BASIC AQUEOUS SOLUTIONS THEREOF

[75] Inventors: Jacques Helgorsky, Frepillon; Alain Levèque, Paris, both of France

[73] Assignee: Rhone-Poulenc Industries, Paris, France

[21] Appl. No.: 923,644

[22] Filed: Jul. 11, 1978

Related U.S. Application Data

[63] Continuation-in-part of Ser. No. 824,068, Dec. 12, 1977.

[30] Foreign Application Priority Data

Jul. 13, 1977 [FR] France .............................. 7721607

[51] Int. Cl.$^2$ .............................................. C01G 15/00
[52] U.S. Cl. ........................... 423/112; 423/DIG. 14; 423/181; 423/658.5; 75/101 BE
[58] Field of Search ...................... 423/112, 658.5, 181, 423/DIG. 14; 75/101 BE

[56] References Cited

U.S. PATENT DOCUMENTS

| | | | |
|---|---|---|---|
| 3,637,711 | 1/1972 | Budde et al. | 75/101 BE |
| 3,971,843 | 7/1976 | Helgorsky et al. | 423/112 |
| 4,066,652 | 1/1978 | Hartlage | 75/101 BE |

OTHER PUBLICATIONS

Stary, "The Solvent Extraction of Metal Chelates," Pergamon Press, N.Y., 1964, pp. 80–86.

*Primary Examiner*—Herbert T. Carter
*Attorney, Agent, or Firm*—Burns, Doane, Swecker & Mathis

[57] ABSTRACT

Gallium values are recovered from highly basic aqueous solutions thereof, especially from sodium-/aluminum liquors of Bayer process origin, by liquid/liquid extraction with a water immiscible organic phase comprising an organic solvent and a dissolved, water-insoluble substituted hydroxyquinoline, said recovery being characterized in that at least the step of extracting the gallium values is conducted under an inert atmosphere.

31 Claims, No Drawings

LIQUID/LIQUID EXTRACTION OF GALLIUM VALUES FROM HIGHLY BASIC AQUEOUS SOLUTIONS THEREOF

CROSS-REFERENCE TO RELATED APPLICATION

This application is a continuation-in-part of our co-pending application, Ser. No. 824,068, filed Aug. 12. 1977, hereby expressly incorporated by reference and relied upon.

BACKGROUND OF THE INVENTION

1. Field of the Invention

The present invention relates to a method for the liquid/liquid extraction and recovery of gallium from very basic solutions, particularly from solutions of sodium aluminate of Bayer process origin, and, more especially, relates to such liquid/liquid extraction wherein at least the step of extracting the gallium values is conducted under an inert atmosphere.

2. Description of the Prior Art

In our previously issued U.S. Pat. No. 3,971,843, hereby expressly incorporated by reference and relied upon, there is described a process for the recovery of gallium present in aqueous alkaline solutions which also contain compounds of aluminum and sodium, by liquid/liquid extraction using substituted hydroxyquinolines. The patented method is especially adapted for the recovery of the gallium present in sodium aluminate lyes originating from the Bayer process, utilizing certain 8-hydroxyquinolines. The gallium recovery method described in the aforementioned patent includes a stage of extraction proper and a stage where the solvent is regenerated and the gallium recovered by means of strong acids. There are several preferred embodiments for carrying out the subject process, depending, on the one hand, on the acid used and its concentration in the stage where the solvent charged with the gallium values is regenerated; on the other hand, the process parameters can be said to depend on the desired purity of the gallium values sought to be recovered.

In the first embodiment, a preferred method of recovering the gallium present in very basic aqueous solutions also containing compounds of aluminum and sodium includes the following stages:

[i] contacting the aqueous solution with a water-insoluble substituted hydroxyquinoline in solution in a water-insoluble organic solvent comprising the halogenated or non-halogenated aliphatic and aromatic hydrocarbons, whereby the gallium and a certain amount of sodium and aluminum values are extracted from the aqueous phase to the organic phase;

[ii] separating the organic phase from the aqueous phase;

[iii] contacting the organic phase with a dilute aqueous solution of an acid to extract the sodium and aluminum from the organic phase, the gallium values remaining in solution in the said organic phase;

[iv] separating the organic phase from the aqueous phase and next contacting the remaining organic phase with a more concentrated aqeuous acid solution, to transfer the gallium from the organic phase into the aqueous phase; and thence

[v] separating the gallium values from the aqueous phase.

The acids used are preferably hydrochloric, sulfuric and nitric. The concentration of the dilute aqueous acid solution is preferably from 0.2 M to 0.5 M, and the concentration of the more concentrated aqueous acid solution is preferably greater than 1.6 M. But in those cases where hydrochloric acid is used, the concentration is preferably from 1.3 M to 2.2 M, and more preferably from 1.6 M to 1.8 M.

In a second embodiment, another preferred method of recovering the gallium values comprises the following stages:

[a] contacting the aqueous solution with a water-insoluble substituted hydroxyquinoline in solution in a water-insoluble organic solvent comprising the halogenated or non-halogenated aliphatic and aromatic hydrocarbons, whereby the gallium and a certain amount of sodium and aluminum values are extracted from the aqueous phase to the organic phase;

[b] separating the organic phase from the aqueous phase;

[c] contacting the organic phase with a concentrated aqueous solution of an acid capable of chelating (complexing) the gallium in anionic form, the gallium values remaining in solution in the organic phase while the sodium and aluminum values transfer into the aqueous phase;

[d] separating the organic phase from the aqueous phase and contacting the remaining organic phase with a dilute aqueous acid solution, whereby the gallium values in the organic phase transfer to the aqueous phase; and

[e] separating the gallium values from the aqueous phase.

The acids used are preferably hydrochloric and hydrobromic acid. The concentration of the concentrated acid solution is preferably from 5 M to 8 M, and that of the dilute solution from 1.3 to 2.2 M.

Further, it too is feasible, if it be acceptable to obtain the gallium values in a less purified state, to conduct the operation in the following seriatim fashion:

[1] contacting the aqueous solution with a water-insoluble substituted hydroxyquinoline in solution in a water-insoluble organic solvent comprising the halogenated or non-halogenated aliphatic and aromatic hydrocarbons, whereby the gallium values and a certain amount of sodium and aluminum values are extracted from the aqueous phase to the organic phase;

[2] separating the organic phase from the aqueous phase;

[3] contacting the organic phase with an aqueous solution of an acid to transfer the gallium, sodium and the aluminum values in the organic phase to the aqueous phase;

[4] separating the aqueous phase from the organic phase; and

[5] recovering the gallium, sodium and aluminum values.

The acid solutions used are preferably either solutions of sulfuric or nitric acids in a concentration of greater than about 1.6 M, or hydrochloric or hydrobromic acids in a concentration from 1.3 M to 2.2 M.

In the gallium extracting stage described in the aforementioned patent, it may be advantageous to add substances with an alcohol function, e.g., heavy alcohols such as N-decanol and isodecanol, and various heavy phenols, as well as various other solvating compounds, e.g., certain phosphoric esters such as tributyl phosphate, in the organic extraction phase, in known manner.

The concentration of substituted hydroxyquinoline in the organic phase is not critical and may vary over wide limits; indeed the same need not be very high, for even a concentration as low as 1% affords good extraction of gallium, due to the far greater affinity of these chelating agents for gallium than for aluminum and sodium; in practice, however, typical concentrations are in the range of from 1% to 50% by volume, with respect to the organic phase, and concentrations of from 6% to 12% have been found to be especially economical.

The topic hydroxyquinolines, moreover, may be employed singly or in any admixture.

Furthermore, although temperature is not a critical parameter for obtaining good results by the method described in our U.S. Pat. No. 3,971,843, it is advantageous for the extraction stage to be carried out at a fairly high temperature, in practice below 100° C., and preferably from 50° to 80° C. It may be added that, in industrial practice, the solutions generally treated are aluminate solutions from the Bayer process, particularly those which are art characterized as "decomposed", which are at a temperature in the vicinity of 50° C., and, although this temperature is less favorable than a higher one, it is nevertheless sufficient to afford satisfactory extraction yields. Moreover, the stage where the solvent is regenerated and the gallium values recovered is carried out in such a way that the organic phase is treated with an acid solution to recover the gallium, at a temperature below that of the extraction stage and preferably near ambient temperature.

The very basic solutions treated by the methods described are notably those in which the OH$^-$ concentration may be as high as 13–14g ions/l. Thus, the caustic sodium aluminate lyes from the Bayer process, which are preferably treated by this method, generally have a composition corresponding to:

Na$_2$O: from 100 to 400 g/l

Al$_2$O$_3$: from 40 to 150 g/l while the so-called "decomposed" caustic solutions typically display such compositions as:

Na$_2$O: from 150 to 200 g/l

Al$_2$O$_3$: from 70 to 100 g/l

In industry, installations used for this method are typically assembled as follows. The sodium aluminate solution, with its alumina content reduced following its "decomposition", and the organic phase comprising the selected chelating agent, a solvent and, optionally, the compounds bearing an alcohol function and other solvating compounds are charged into a first counter-current extraction apparatus. A large proportion of the gallium values transfer into the organic phase, the proportion depending upon the respective rates of flow of the two liquids. Aluminum, sodium and certain impurities also transfer into the organic phase. In another extraction apparatus, the resulting organic phase is contacted with a first regenerating solution, comprising a dilute strong acid or a concentrated strong chelating acid; in both instances this leaves virtually only gallium values in the organic phase. The latter organic phase is then treated in a third countercurrent extraction apparatus, whereat it is contacted with a strong acid for the purpose of recovering the gallium, and is then washed with water before the organic phase is recycled into the first countercurrent extraction apparatus. The acid solution, which now includes the gallium values, is then treated to complete its purification; thence the gallium values are extracted therefrom.

Further, a simple commercial installation can be utilized if it be desired to recover less purified gallium values. Such an apparatus may include a first extraction apparatus as described hereinabove, at the outlet of which the organic phase is treated in a countercurrent extraction apparatus where it contacts a solution of a strong acid for the purpose of recovering the gallium, sodium and aluminum.

It had also been found, however, that extended use of alkenyl-8-hydroxyquinoline in a gallium extracting unit by the methods described in the aforementioned patent ultimately resulted in their gradual degradation, thus effecting a reduction in their extracting power.

But described in our copending application, Ser. No. 824,068, is a certain group of hydroxyquinolines which were found to be particularly stable, which did not deteriorate over prolonged periods of time, and which retained the noted and notable initial properties of the alkenyl-8-hydroxyquinolines as described in our earlier patent for extracting gallium from sodium aluminate lyes.

The invention disclosed in our Ser. No. 824,068 application reflects an important improvement over the process of our earlier patent for recovering the gallium values contained in very basic aqueous solutions by liquid/liquid extraction, by utilizing an organic phase chiefly consisting of water-insoluble substituted hydroxyquinolines and an organic solvent, characterized in that the substituted hydroxyquinolines are selected from the group consisting of those of the structural formula:

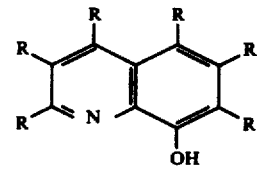

wherein each R, which may be the same or different, is an alkyl radical or hydrogen.

In a preferred embodiment of the invention disclosed and claimed in our said Ser. No. 824,068 application, alkyl radicals R has 5 to 20 carbon atoms. Below about 5 carbon atoms, such substituted hydroxyquinolines were generally found to have a solubility which was too great in an acid or basic medium, thus making their use uneconomical due to subsequent losses. Above about 20 carbon atoms, the substituted hydroxyquinolines of the Ser. No. 824,068 application have a viscosity which makes them quite difficult to use.

In another preferred embodiment of the invention of the Ser. No. 824,068 application, the radical R is located in the 7-position on the 8-hydroxyquinoline ring, and those particular preferred compounds have the structural formula:

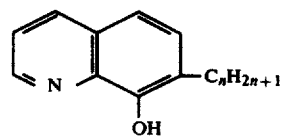

wherein n is preferably between 5 and 20.

The hydroxyquinolines of our copending application enable the gallium values present in very basic aqueous solutions, particularly in sodium aluminate lyes emanating from the Bayer process, to be almost totally extracted with any loss over prolonged periods of time.

Nonetheless, it has now been found that, even though the essential cause of the degradation of the 8-hydroxyquinolines is the highly basic nature of the medium to be extracted, (1) the ambient air (oxygen) oxidation thereof also contributes significantly to the degradation phenomenon over prolonged periods of use, and (2) such oxidative degradation due to the oxygen in the ambient air affects the different 8-hydroxyquinolines to varying or different degrees.

DESCRIPTION OF THE INVENTION

It has now unexpectedly been determined, and which forms the subject of the present invention, that not only do the gallium values continue to be essentially wholly recovered from highly basic aqueous solutions thereof via our patented method and the method of our 842,068 copending application, but also that the loss of hydrozyquinoline through oxidative degradation is markedly diminished, by conducting at least the gallium extraction step of the topic liquid/liquid extraction under an inert, gaseous atmosphere.

Also according to the invention, the entire liquid/liquid extraction is advantageously carried out under an inert atmosphere, and, as representative examples of suitable inert gases defining the inert atmosphere, there are mentioned argon, nitrogen, and the like.

The several preferred embodiments of our patented process as hereinabove characterized, moreover, too are applicable to the improved process according to this invention. Again, while any one or more, or all, of the several stages of the subject liquid/liquid extraction may be conducted while under the inert atmosphere, it is critical that at least the step of extraction of the gallium values be so conducted. The step of extraction is referred herein above as respectively stages (i), (a), (I) in the preferred embodiments.

In order to further illustrate the present invention and the advantages thereof, the following specific example is given, it being understood that the same is intended only as illustrative and in nowise limitative. The example clearly reflects that extraction of the gallium values from Bayer process caustic while the extraction medium is under an inert gaseous blanket or atmosphere strikingly reduces the loss of the 8-hydroxyquinoline; thus, markedly improving the economics of the extraction.

EXAMPLE

The following hydroxyquinoline of the structural formula

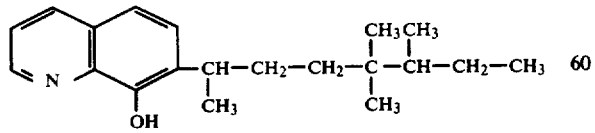

was employed in an extraction of gallium values from Bayer process caustic according to the invention.

A Bayer caustic solution having a composition of 82 g/l $Al_2O_3$, 185 g/l $Na_2O$, and 240 mg/l Ga, was agitated with an organic phase consisting of the hydroxyquinoline in a 10% solution, in a 90-10 kerosene-decanol mixture, the operation being conducted at 50° C. in free air, and in a nitrogen atmosphere, respectively. The hydroxyquinoline content of the organic phase was analyzed as a function of the time of agitation by gaseous phase chromatography. The results obtained are compiled in the following table, which reflects the percentage loss of the hydroxyquinoline.

TABLE

| Time (hours) | 24 | 100 | 250 | 500 |
|---|---|---|---|---|
| In air (% loss) | 5% | 20% | 55% | 90% |
| Under Nitrogen (% loss) | — | 2% | 4% | 7% |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a method for recovering gallium values contained in a basic aqueous solution by liquid/liquid extraction comprising extracting the basic aqueous solution with a water immiscible organic phase comprising an organic solvent and a dissolved, water-insoluble substituted hydroxyquinoline whereby the gallium values are transferred into the organic phase; separating the organic phase from the basic aqueous solution and recovering the gallium values from the organic phase, the improvement which comprises conducting, under an inert gas atmosphere, at least the step of extraction of the gallium values.

2. The method as defined by claim 1, wherein the inert atmosphere is gaseous nitrogen.

3. The method as defined by claim 1, wherein the inert atmosphere is gaseous argon.

4. The method as defined by claim 1, wherein the very steps aqueous solutions which are extracted by means of the organic phase are sodium aluminate solutions emanating from the production of alumina by the Bayer process, and containing gallium, aluminum and sodium values.

5. The method as defined by claim 4, which includes the step of:

(i) contacting the aqueous sodium aluminate solution with the organic phase, whereby gallium values and part of the amount of sodium and aluminum values are extracted from the aqueous phase to the organic phase;

(ii) separating the organic phase from the aqueous phase;

(iii) contacting the organic phase with a dilute aqueous solution of an acid, to extract sodium and aluminum values from the organic phase, and maintaining the gallium values in solution in the said organic phase;

(iv) separating the organic from the aqueous phase and contacting the remaining organic phase with a more concentrated aqueous acid solution, to transfer the gallium values from the organic phase to the aqueous phase; and (v) separating the gallium values from the aqueous phase.

6. The method as defined by claim 5, in which the acid is selected from the group consisting of hydrochloric, sulfuric and nitric acid.

7. The method as defined by claim 5, in which the concentration of the dilute aqueous acid solution is from 0.1 M to 1 M.

8. The method as defined by claim 5, in which the concentration of the more concentrated aqueous acid solution is greater than 1 M.

9. The method as defined by claim 4, which includes the steps of:
[i] contacting the aqueous sodium aluminate solution with an organic phase, whereby gallium values and a certain amount of sodium and aluminum values are extracted from the aqueous to the organic phase, and in which the organic solvent is selected from the group consisting of halogenated and nonhalogenated aliphatic and aromatic hydrocarbons;
[ii] separating the organic phase from the aqueous phase;
[iii] contacting the organic phase with a concentrated aqueous solution of an acid capable of chelating the gallium in anionic form, the gallium values remaining in solution in the organic phase while the sodium and aluminum values are transferred into the aqueous phase;
[iv] separating the organic phase from the aqueous phase and contacting the remaining organic phase with a dilute aqueous acid solution, whereby gallium values transfer from the organic to the aqueous phase; and
[v] separating the gallium values from the aqueous phase.

10. The method as defined by claim 9, in which the acid is selected from the group consisting of hydrochloric and hydrobromic acid.

11. The method as defined by claim 9, in which the concentrated aqueous acid solution has a concentration of from 5 M to 8 M.

12. The method as defined by claim 9, in which the concentration of the dilute aqueous acid solution is less than 2.2 M.

13. The method as defined by claim 5, wherein the first stage in the process, the contacting of the aqueous sodium aluminate solution with the organic phase, is carried out at elevated temperature of less than 100° C.

14. The method as defined by claim 5, in which the organic phase comprising gallium values is treated with an aqueous acid solution at a temperature below that of the first stage of contacting the aluminate solution with the organic phase.

15. The method as defined by claim 14, in which the temperature used is ambient temperature.

16. The method as defined by claim 4, which includes the following steps:
[i] contacting the aqueous solution with a water-insoluble substituted hydroxyquinoline in solution in a water-insoluble organic solvent selected from the group consisting of halogenated or non-halogenated aliphatic and aromatic hydrocarbons, whereby the gallium values and part of the amount of sodium and aluminum values are extracted from the aqueous phase to the organic phase;
[ii] separating the organic phase from the aqueous phase;
[iii] contacting the organic phase with an aqueous solution of an acid, whereby the gallium, sodium and the aluminum values in the organic phase are transferred to the aqueous phase;
[iv] separating the aqueous phase from the organic phase; and
[v] recovering the gallium value together with sodium and aluminum values.

17. The method as defined by claim 16, in which the acid used is selected from the group consisting of sulfuric, nitric, hydrochloric and hydrobromic acids.

18. The method as defined by claim 17, in which the concentration of the sulfuric and nitric acids is above 1.6 M.

19. The method as defined by claim 17, in which the concentration of hydrochloric and hydrobromic acids is from 1.3 to 2.2 M.

20. The method as defined by claim 9, wherein the first stage of the process, comprising contacting the aqueous sodium aluminate solution with the organic phase, said contacting is carried out at elevated temperature of less than 100° C.

21. The method as defined by claim 9, in which the organic phase containing gallium values is treated with an aqueous acid solution at a temperature below that of the first stage for contacting the aluminate solution with the organic phase.

22. The method as defined by claim 21, in which the temperature is about ambient temperature.

23. The method as defined by claim 16, wherein the first stage of the process, comprising contacting the aqueous sodium aluminate solution with the organic phase, said contacting is carried out at elevated temperature of less than 100° C.

24. The method as defined by claim 16, in which the organic phase containing gallium values is treated with an aqueous acid solution at a temperature below that of the first stage for contacting the aluminate solution with the organic phase.

25. The method as defined by claim 24, in which the temperature is about ambient temperature.

26. The method as defined by claim 1, the hydroxyquinoline having the structural formula:

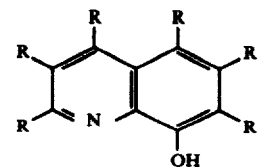

wherein each R, which may be the same or different, is selected from the group consisting of hydrogen and the alkyl group $C_nH_{2n+1}$.

27. The method as defined by claim 1, the hydroxyquinoline having the structural formula:

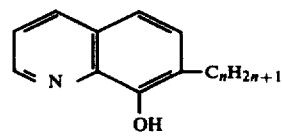

wherein n is a number of from 5 to 20.

28. The method as defined by claim 1, the hydroxyquinoline having the structural formula:

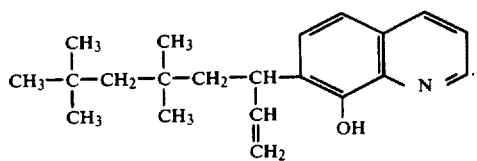
29. The method as defined by claim 1, wherein any one or more of the liquid/liquid extraction stages, in addition to the extraction step proper of the gallium values, is conducted under an inert atmosphere.
30. The method as defined by claim 29, wherein all stages are conducted under an inert atmosphere.
31. The method as defined by claim 26, wherein n is a number of from 5 to 20.
* * * * *